(12) United States Patent
Dinh et al.

(10) Patent No.: US 6,827,229 B2
(45) Date of Patent: Dec. 7, 2004

(54) ELECTRICAL BOX FOR CEILING FANS

(75) Inventors: Cong T. Dinh, Memphis, TN (US); John Archer, Cordova, TN (US)

(73) Assignee: Thomas & Betts International, Inc., Sparks, NV (US)

( * ) Notice: Subject to any disclaimer, the term of this patent is extended or adjusted under 35 U.S.C. 154(b) by 48 days.

(21) Appl. No.: 10/146,995

(22) Filed: May 16, 2002

(65) Prior Publication Data

US 2002/0179599 A1 Dec. 5, 2002

Related U.S. Application Data

(60) Provisional application No. 60/374,895, filed on Apr. 23, 2002, and provisional application No. 60/293,439, filed on May 24, 2001.

(51) Int. Cl.[7] .............................................. H02D 3/08
(52) U.S. Cl. ......................................... 220/3.3; 220/3.9
(58) Field of Search ........................ 220/3.3, 3.9, 3.92, 220/3.54

(56) References Cited

U.S. PATENT DOCUMENTS

| | | | |
|---|---|---|---|
| 2,907,419 A | | 10/1959 | Klank |
| 2,921,655 A | | 1/1960 | McGregor |
| 2,948,317 A | | 8/1960 | Munro |
| 3,701,448 A | * | 10/1972 | Vadnais ...................... 220/3.9 |
| 3,822,783 A | | 7/1974 | Mortensen |
| 4,296,520 A | | 10/1981 | Arndt |
| 4,358,874 A | | 11/1982 | Kaiser |
| 4,871,062 A | | 10/1989 | Gordon, Jr. |
| 4,874,905 A | | 10/1989 | Schnell et al. |
| 4,877,364 A | | 10/1989 | Sorrentino |
| 5,234,119 A | | 8/1993 | Jorgensen et al. |
| 5,407,088 A | * | 4/1995 | Jorgensen et al. ........... 220/3.9 |
| 5,472,081 A | | 12/1995 | Kilgrow et al. |
| 5,603,594 A | | 2/1997 | Lincoln |
| 5,854,443 A | * | 12/1998 | Reiker .......................... 174/58 |
| 6,174,119 B1 | | 1/2001 | Orr |
| 6,191,362 B1 | * | 2/2001 | Gretz ........................... 174/58 |
| 6,207,897 B1 | * | 3/2001 | Reiker .......................... 174/58 |
| 6,335,486 B1 | * | 1/2002 | Reiker .......................... 174/51 |

* cited by examiner

Primary Examiner—Joseph Man-Fu Moy
(74) Attorney, Agent, or Firm—Hoffmann & Baron, LLP

(57) ABSTRACT

A ceiling fan box adapted to be mounted on a structural member, such as a ceiling joist, and adapted to provide a ceiling fan direct securement to the structural member. The ceiling box includes a body having a lower surface and a pair of spaced apart opposed side members defining a recess therebetween for receiving the structural member therein. An aperture formed through the lower surface for receiving a fastener therein for securement to the structural member for supporting the body thereon. A pair of spaced apart openings formed through the lower surface for receiving a respective pair of fan supporting fasteners therethrough for directly securing a fan to the structure member.

13 Claims, 10 Drawing Sheets

ELECTRICAL BOX FOR CEILING FANS

This application claims the benefit of U.S. Provisional Application No. 60/293,439, filed on May 24, 2001 and U.S. Provisional Application No. 60/374,895, filed on Apr. 23, 2002.

FIELD OF THE INVENTION

The present invention relates generally to an electrical box mountable on the ceiling for supporting a ceiling fan. More particularly, the present invention relates to a ceiling fan box which is mountable directly to a ceiling joist.

BACKGROUND OF THE INVENTION

In order to mount ceiling fans, ceiling fan boxes are typically used. A ceiling fan box which is attachable to a ceiling joist or other support in the ceiling generally serves two functions. First, it encloses the electrical wire terminations which are made between the ceiling fan and the electrical power run to the ceiling fan. Second, the ceiling fan box supports the ceiling fan during operation. Such boxes may be used with existing construction (old work) where the ceiling fan is being installed in a finished area, or during construction (new work) where the ceiling fan may be installed prior to installation of the ceiling. In either case, it is necessary to attach the ceiling fan box to the ceiling joist or other ceiling supported structure. It may be appreciated that working overhead in a ceiling is difficult. Thus, the method of attaching the ceiling fan box to the ceiling joist, is critical with respect to both convenience and time savings.

Moreover, the ceiling fan box must be of construction which can withstand the dynamic load imparted by the ceiling fan which is attached thereto. Such dynamic loads may also include loads imparted by an unbalanced ceiling fan.

It is therefore desirable to provide a ceiling fan box which may be easily attached to a ceiling structure such as a ceiling joist and which securely supports the ceiling fan therefrom.

DETAILED DESCRIPTION OF THE PREFERRED EMBODIMENTS

The present invention provides a ceiling fan box which is attachable to a ceiling joist for supporting a ceiling fan therefrom. The electrical ceiling box of the present invention is an improvement in boxes of the type generally shown and described in U.S. Pat. No. 5,234,119, issued Aug. 10, 1993 and U.S. Pat. No. 4,874,905, issued Oct. 17, 1989, the disclosures of each are being incorporated by reference herein for all purposes.

Figure 1:
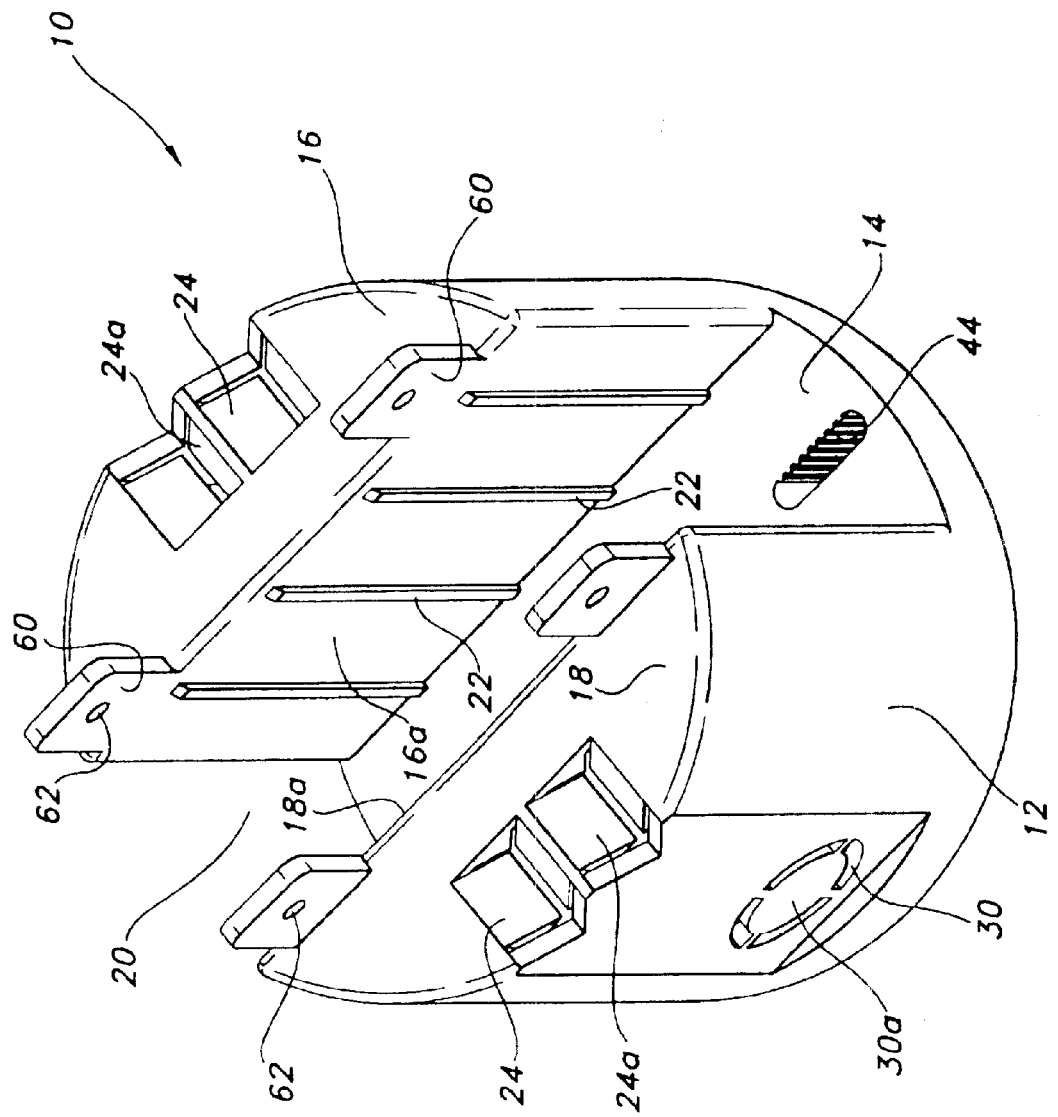
FIG. 1 is a top perspective view of an improved electrical ceiling fan box of the present invention.
Figure 2:
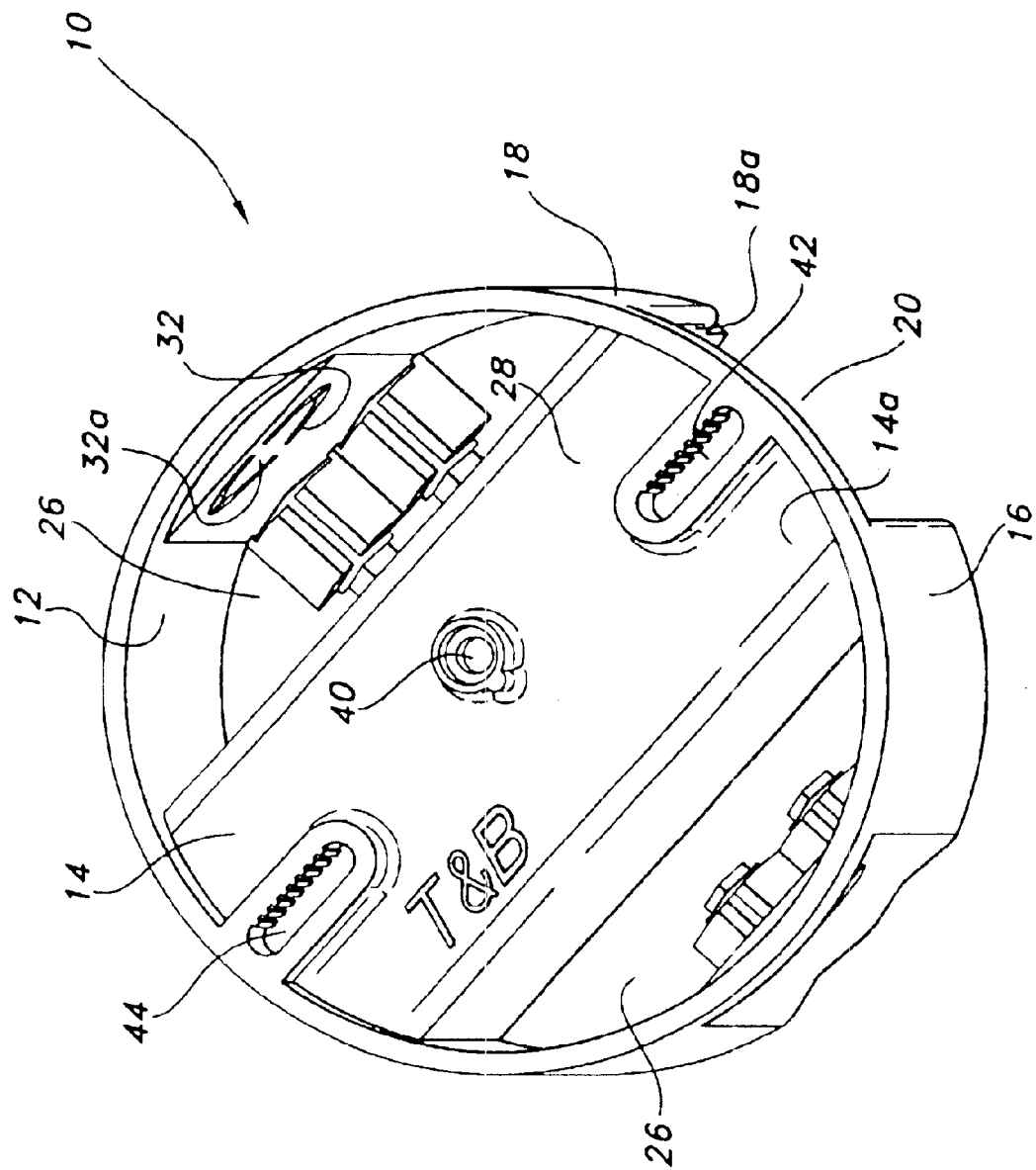
FIG. 2 is a lower perspective showing of the electrical ceiling fan box of FIG. 1.

Referring now to FIGS. 1 and 2, an embodiment of the electrical ceiling box of the present invention is shown. While referred to as a box, the ceiling fan box 10 of the present invention is general cylindrical in shape and includes a body 12 having a planar lower surface 14, a pair of upstanding side members 16 and 18 on either side of lower surface 14. The side members 16 and 18 and the lower surface 14 define a generally U-shaped recess 20 for accommodating a ceiling joist (not shown) therein. Side members 16 and 18 include facing side walls 16a and 18a which are spaced apart a distance generally equivalent to the width of a ceiling joist. The ceiling joist is inserted into recess 20 and is frictionally retained therein by frictional engagement with walls 16a and 18a. In order to assist in the frictional retention of the body 12 about the joist, the side walls 16a and 18a include a plurality of spaced apart elongate outwardly extending ribs 22 therealong. The ribs 22 help to provide frictional engagement with the opposed side surfaces of the joist which is inserted into recess 20. Side members 16 and 18 further include a plurality of wire entry apertures 24 which may be enclosed by frangibly removable covers 24a. The apertures 24 permit insertion of wires into hollow cavities 26 defined by side members 16 and 18.

As shown in FIG. 2, wire terminations for attachment to a ceiling fan may be made in the recesses 26 and the area 28 defined by the opposite side 14a of lower surface 14. Side members 16 and 18 further include knockout openings 30 and 32, respectively, which include frangibly removable covers 30a and 32a which are also designed to permit wire entry. Once the covers are removed, the knockouts can support an electrical nipple which facilitates wire entry.

Lower surface 14 includes a centrally located aperture 40 and a pair of elongate openings 42 and 44. Openings 42 and 44 extend from adjacent the peripheral edge of body 12 and extend through surface 14.

Box 10 may be inserted onto a stud by placing the box in a straddling position around the ceiling joist with the ceiling joist being frictionally retained within recess 20 thereof. Frictional retention is provided by the engagement between the walls 16a and 18a of side members 16 and 18 with the opposed side surface of the joist. The box 10 is inserted until the lower surface 14 rests against the lower edge of the joist. In this position, while the outlet box is frictionally retained on the joist, the outlet box may be more securely fastened thereto by inserting an appropriate fastener such as a wood screw through aperture 40 and into the face of the joist.

Once the box is securely fastened to the joist, the ceiling fan may be supported directly to the joist through the box. This is accomplished by inserting the fastening hardware, such as wood screws, of the ceiling fan through openings 42 and 44 and directly into the face of the joist against which the box is supported. The elongate openings 42 and 44 allow for adjustable positioning so as to help properly align the ceiling fan. Thus, the ceiling fan is supported directly to the joist through the ceiling box and the ceiling box need not be relied upon for support of the ceiling fan. The box, however, provides an adequate enclosure for housing the wire terminations to the ceiling fan.

The present invention further provides a pair upwardly directed spaced apart extensions 50 along each side wall 16a and 18a of side members 16 and 18. Extensions 60 are flush with side walls 16a and 18a so that they are positioned along the opposed sides of the joist. Each extension 60 includes an aperture 62 therethrough through which an appropriate fastener such as a wood screw may be inserted to more securely retain the box on the joist.

Figure 3:
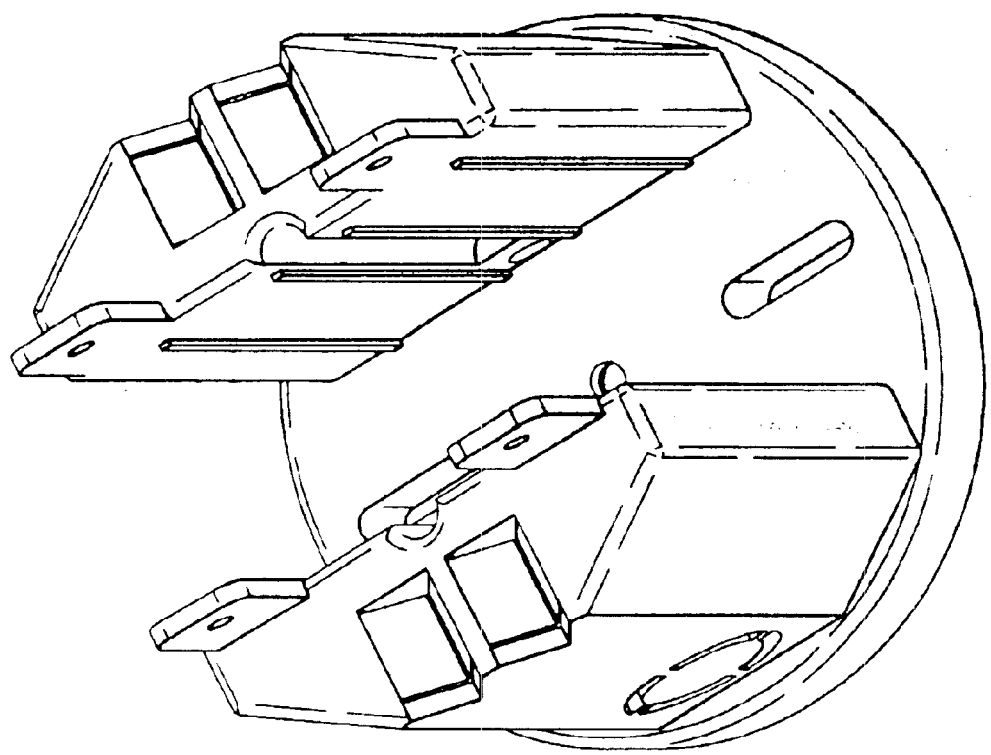
FIGS. 3 and 4 show respectively a top perspective and bottom perspective view of a further embodiment of the electrical ceiling fan box of the present invention.
Figure 4:
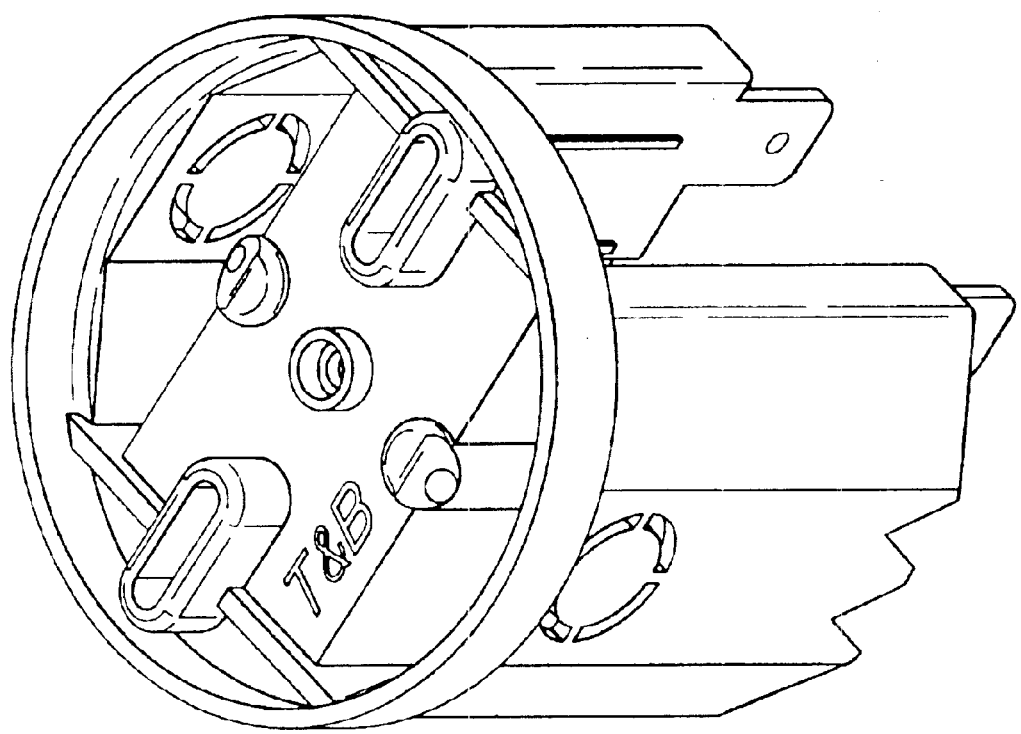

Referring now to FIGS. 3 and 4, a further embodiment of the present invention is shown. The embodiment in FIGS. 3 and 4 is similar to the embodiment shown in FIGS. 1 and 2, however, a 45° opening is shown in the lower portion of the side members to allow insertion of a wood screw or similar fastening hardware to secure the box to the sides of the joist inserted therein.

Figure 5:
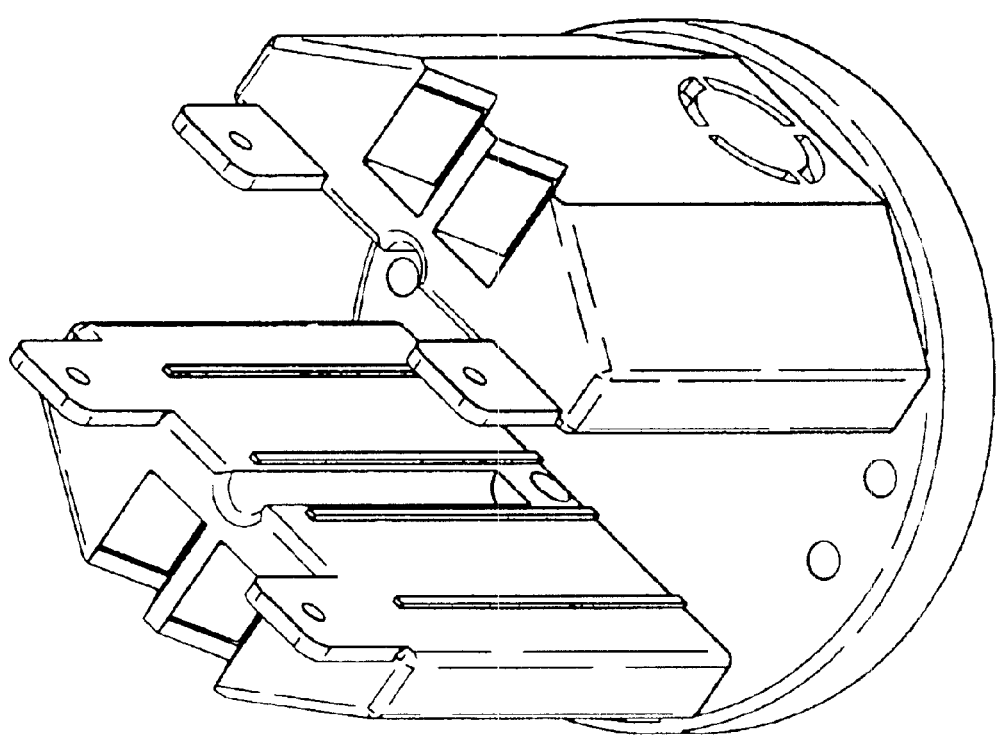
FIGS. 5 and 6 show top and bottom perspective views, respectively of a still further embodiment of the electrical ceiling fan box of the present invention.
Figure 6:
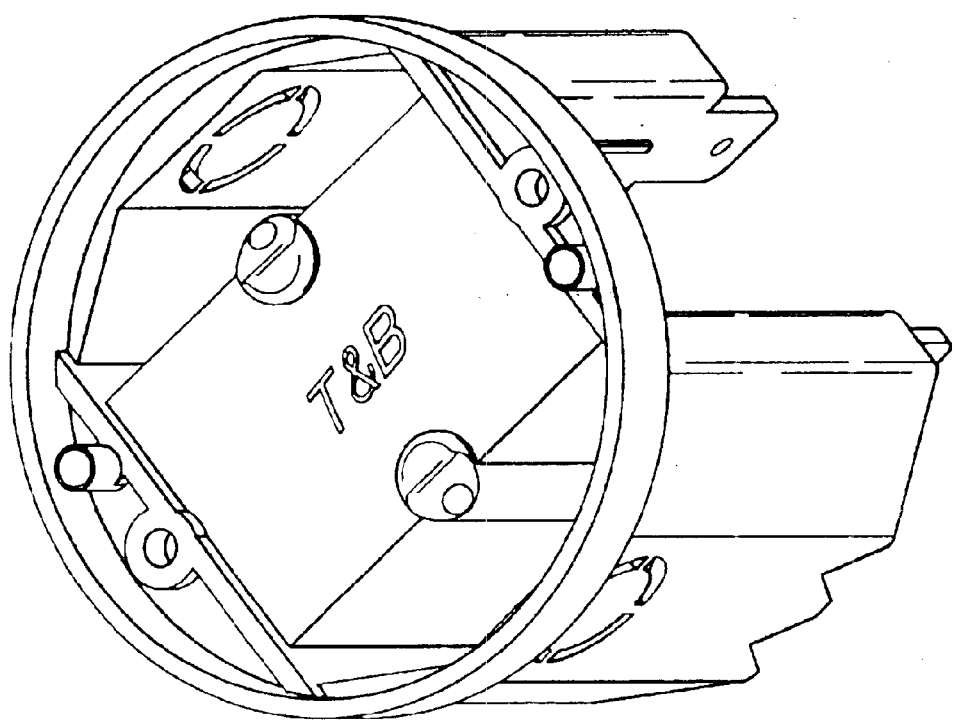

FIGS. 5 and 6 show a still further embodiment of the box of the present invention. The embodiment of FIGS. 5 and 6 is substantially similar to the embodiment of FIGS. 3 and 4, but provides a different arrangement for the apertures for mounting the ceiling fan.

Figure 7:
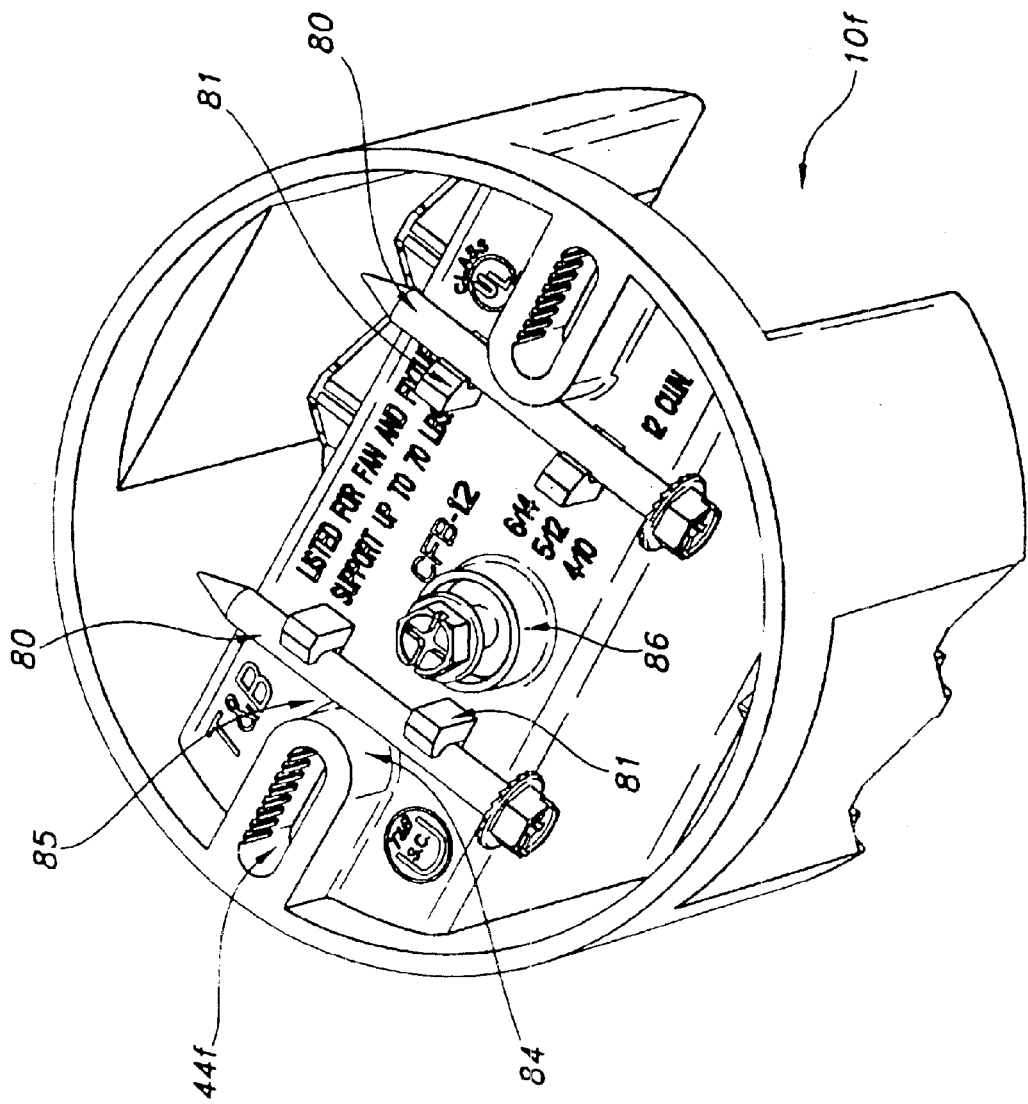
FIG. 7 shows a top perspective view of another embodiment of the electrical ceiling fan box of the present invention.

Another embodiment of the box of the present invention as shown in FIG. 7 is substantially similar to the embodiment of the previous figures, but provides a screw retention feature 85 to temporarily hold screws 80 to the ceiling fan box 10f prior to use. In this embodiment, as shown in FIG. 7, the screw retention structure 85 preferably includes two pair of flexible prongs, uprights or clips 81 which removably secure the screws 80 against the wall structure 84 of the elongated boss defining opening 44f. Screw 80 is secured by clips 81, which wrap around a portion of the screw and cause the screw to press against the wall structure 84. The distance between the clips 81 and the wall structure 84 is far enough for placement of a screw without undue stress and tension of the wall structure 84 and clips 81; yet it is close enough to removably secure the screw 80 but prevent dislodgement during shipment.

One aspect of the retention feature 85 is that the screws 80 are detachable by a user, such as an electrician, to employ during installation of the electrical box 10f. While the screw retention feature 85 is shown as using the wall structure 84, it should also be appreciated that other structures of the box, such as central boss 86, may be used to provide the screw retention feature.

Figure 8:
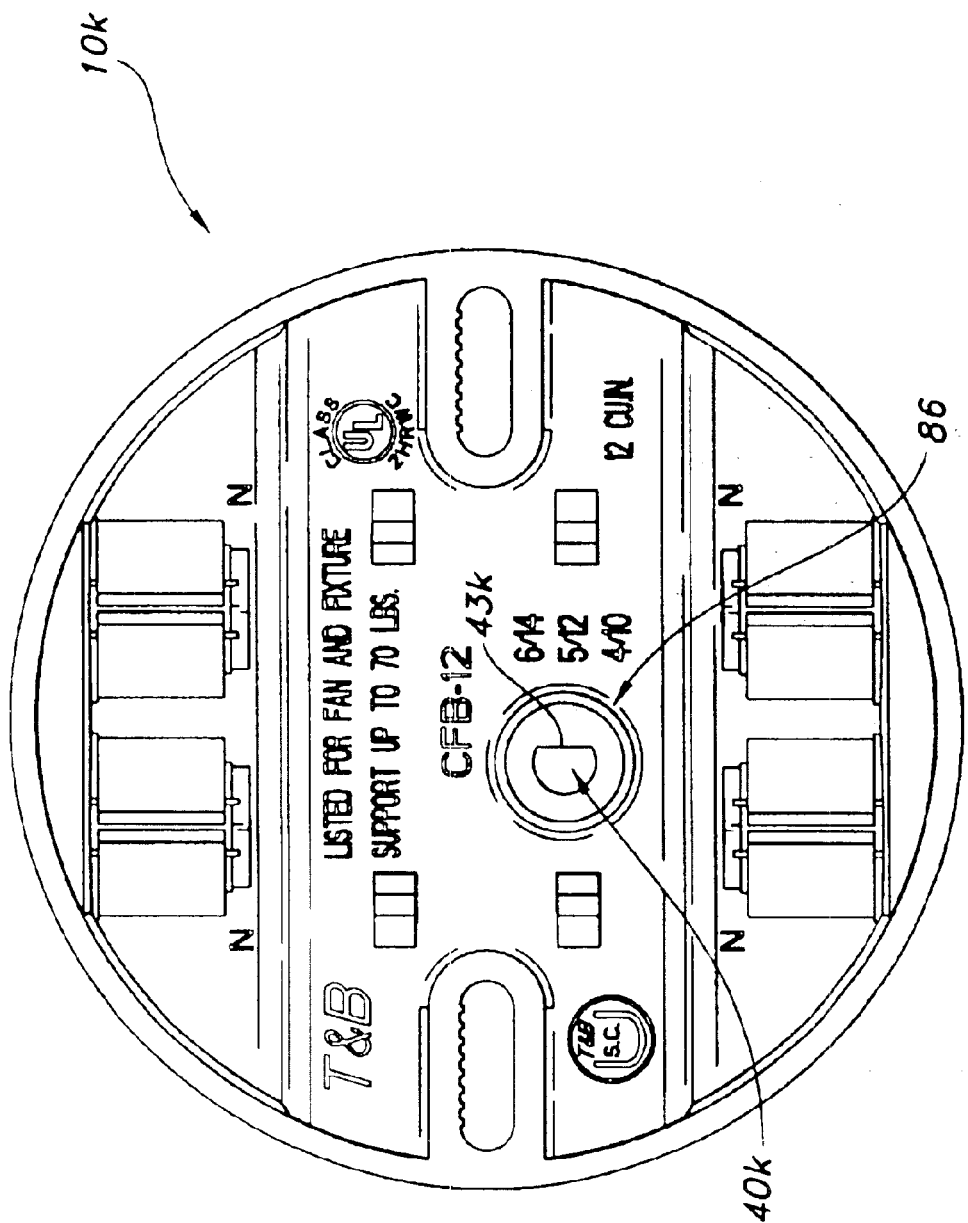
FIG. 8 shows a top plan view of the ceiling fan box of FIG. 7.

As shown in FIG. 8, box 10f has a central opening 40k extending through central boss 86. The opening 40k is provided with a flattened surface 43k such that the aperture 40k appears to have a "D" shape. Such "D" shaped opening provides for further screw holding capability. It should be appreciated that the flat surface 43k may be located at any surface defining the aperture 40k.

Figure 9:
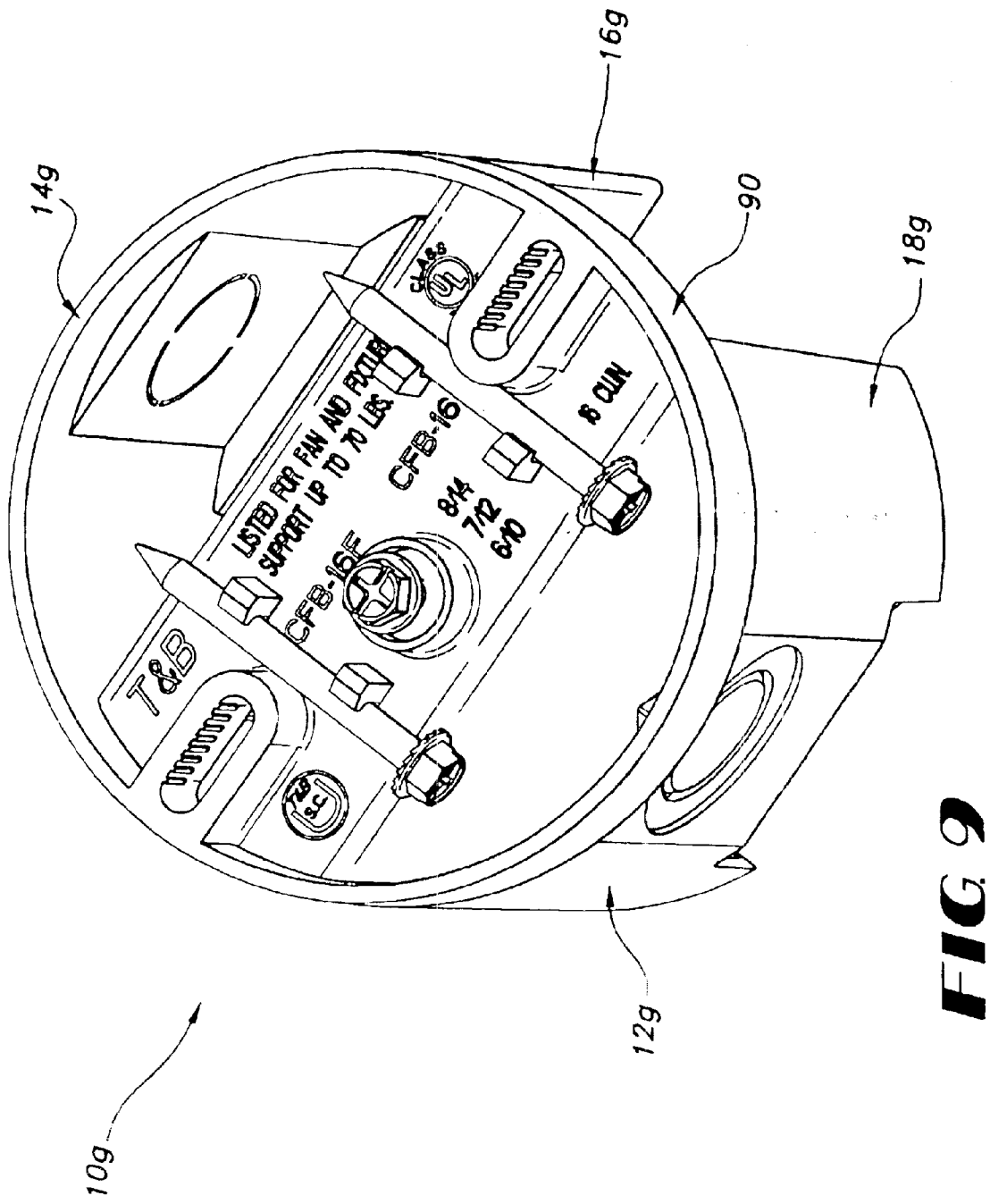
FIG. 9 shows a top perspective view of yet another embodiment of the electrical ceiling fan box of the present invention.

Yet another embodiment of the ceiling fan box is shown in FIG. 9. Box 10g is substantially similar to the box of FIGS. 7 and 8, but provides a different shape to the body of the electrical box. The box 10g is generally cylindrical in shape and includes a body 12g having a rim 90 extending circumferentially around the upper end 14g thereof. A pair of side members 16g and 18g extend downwardly from either side of the upper end 14g. The rim 90 has a diameter extending outwardly radially beyond the outer surfaces of side members 16g and 18g such that the side members 16g and 18g appear to be recessed within the rim 90.

Figure 10:
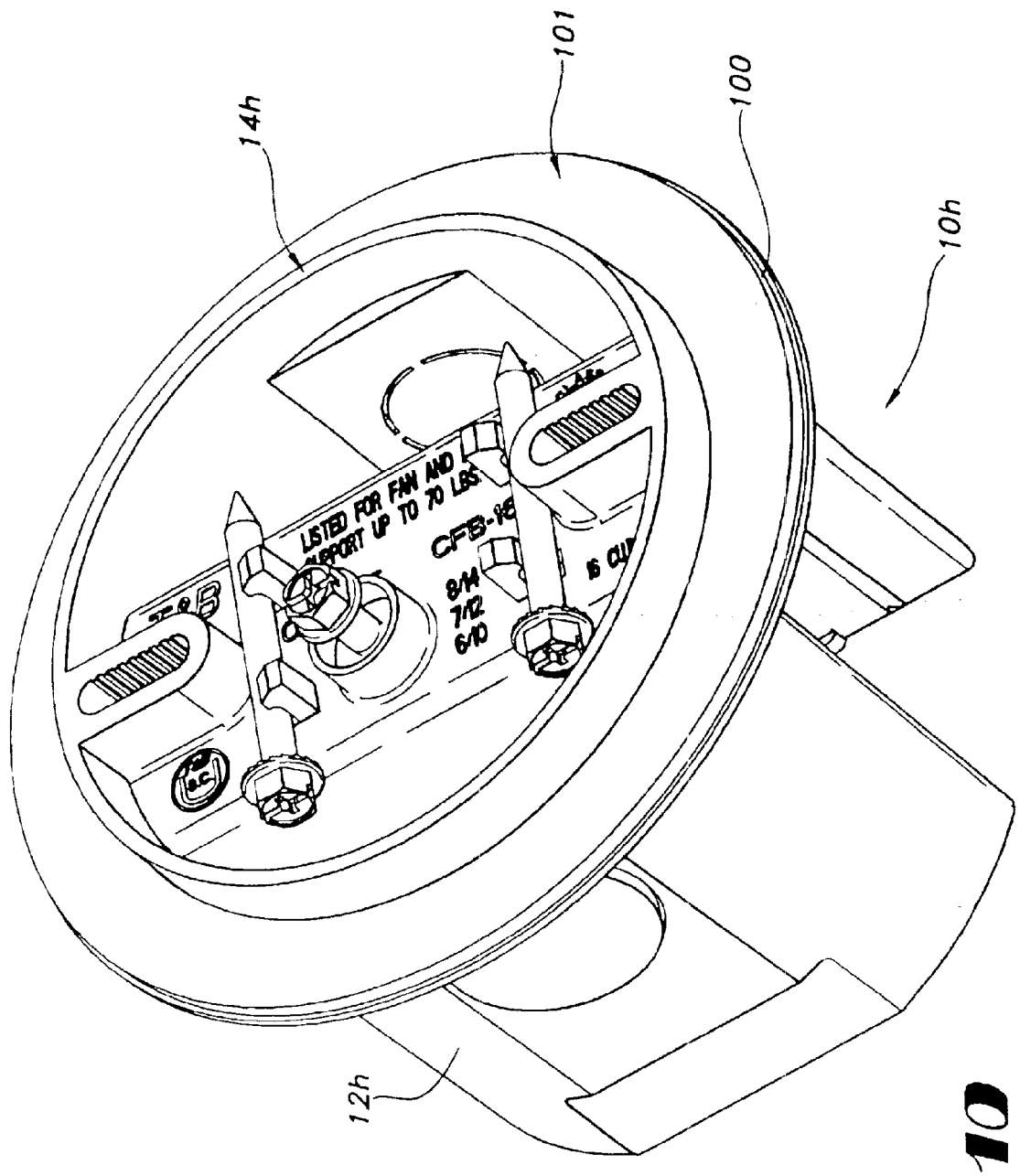
FIG. 10 shows a top perspective view of still yet another embodiment of the electrical ceiling fan box of the present invention.

FIG. 10 shows yet still another embodiment of the present invention. FIG. 10 is substantially similar to FIGS. 7 and 8, however, a collar or flange 100 is shown extending outwardly around the body 12h of the box 10h. Flange 100 extends fully circumferentially around the periphery of the upper end 14h of the box 10h. A strip of insulating material, such as foam 101, may be provided on the upper surface of flange 100 to create a seal in conduction with the ceiling wallboard for enhancing energy efficiency.

What is claimed is:

1. A ceiling fan box for mounting on a structural member comprising:

a body having a lower surface and a pair of spaced apart opposed side members defining a recess therebetween for receiving said structural member therein;

an aperture formed through said lower surface for receiving a fastener therein for securement to said structural member for supporting said body thereon;

a pair of spaced apart openings formed through said lower surface for receiving a respective pair of fan supporting fasteners therethrough for directly securing a fan to said structural member; and a pair of flexible members formed on said lower surface for removably securing fasteners until detached by a user.

2. A ceiling fan box of claim 1, wherein said aperture is generally centrally located in said lower surface.

3. A ceiling fan box of claim 1, wherein said aperture has a flattened surface for further securement of a fastener.

4. A ceiling fan box of claim 3, wherein said side members each have at least one wire entry apertures therethrough.

5. A ceiling fan box of claim 4, wherein said body comprising a generally cylindrical shape box having an upper surface opposing said lower surface, a rim extending circumferentially around said upper surface and outwardly radially beyond said side members for providing more stability for said ceiling fan.

6. A ceiling fan box of claim 1, wherein said openings are disposed with one opening each on opposite sides of said aperture.

7. A ceiling fan box of claim 1, wherein said aperture and said pair of openings are substantially linearly aligned.

8. A ceiling fan box of claim 1, wherein said openings of each pair are elongated.

9. A ceiling fan box of claim 1, wherein said pair of openings are located at a peripheral edge of said body.

10. A ceiling fan box of claim 1, wherein said aperture is generally centrally located in said lower surface.

11. A ceiling fan box of claim 1, wherein each of said side members includes side surfaces extending perpendicularly to said lower surface, said side surfaces and said lower surface defining said recess, said side surfaces having at least one elongated outwardly extending ribs thereon for providing frictional engagement with said structural member.

12. A ceiling fan box of claim 1, wherein each of said side surfaces includes a planar extension member having a surface coplanar with said side surfaces, and a hole therethrough for receiving a fastener therein for further securement of said box to said structural member.

13. A ceiling fan box of claim 1, wherein said side members each have at least one wire entry apertures therethrough.

* * * * *